United States Patent
Touwslager et al.

(10) Patent No.: US 7,957,051 B2
(45) Date of Patent: Jun. 7, 2011

(54) FLEXIBLE DISPLAY AND A METHOD OF PRODUCING A FLEXIBLE DISPLAY

(75) Inventors: Fredericus Johannes Touwslager, Veldhoven (NL); Erik van Veenendaal, Eindhoven (NL)

(73) Assignee: Polymer Vision Limited, Eindhoven (NL)

( * ) Notice: Subject to any disclaimer, the term of this patent is extended or adjusted under 35 U.S.C. 154(b) by 0 days.

(21) Appl. No.: 12/528,260

(22) PCT Filed: Feb. 20, 2008

(86) PCT No.: PCT/NL2008/050095
§ 371 (c)(1),
(2), (4) Date: Feb. 17, 2010

(87) PCT Pub. No.: WO2008/103039
PCT Pub. Date: Aug. 28, 2008

(65) Prior Publication Data
US 2010/0142029 A1    Jun. 10, 2010

Related U.S. Application Data

(60) Provisional application No. 60/890,848, filed on Feb. 21, 2007.

(51) Int. Cl.
*G02B 26/00* (2006.01)
(52) U.S. Cl. ........................ 359/296; 345/107
(58) Field of Classification Search .................. 359/296; 345/107

See application file for complete search history.

(56) References Cited

U.S. PATENT DOCUMENTS

| 2004/0027327 A1 | 2/2004 | Lecain et al. | |
| 2008/0074368 A1* | 3/2008 | Edwards et al. | 345/87 |

FOREIGN PATENT DOCUMENTS

| EP | 1 775 626 A | 4/2007 |
| WO | WO 03/104884 A2 | 12/2003 |
| WO | WO 2004/086530 A | 10/2004 |
| WO | WO 2006/061786 A1 | 6/2006 |

OTHER PUBLICATIONS

Search Report for International Patent Application No. PCT/NL2008/050095 dated May 7, 2008.

* cited by examiner

*Primary Examiner* — Scott J Sugarman
*Assistant Examiner* — James C Jones

(57) ABSTRACT

The invention relates to a flexible display (40) comprising a frontplane (42), positioned on top of the backplane (44). Preferably, the frontplane (44) is laminated on top of the backplane (42). The flexible display (40) further comprises a bonding area (48). In accordance to the invention the frontplane (44) extends over an area (46) substantially corresponding with the bonding area (48). Preferably, the frontplane in the region of the bonding are (48) is provided with spacings (47) for arrangement of suitable electrical contacts for enabling a connectivity to the array of electronic pixels and/or to the array of electro-optic elements. The spacings (47) may be of any suitable shape being arranged individually or being interconnected with each-other to form a sole spacing on top of the bonding area (48).

14 Claims, 4 Drawing Sheets

FLEXIBLE DISPLAY AND A METHOD OF PRODUCING A FLEXIBLE DISPLAY

FIELD OF THE INVENTION

The invention relates to a flexible display comprising
a backplane comprising a substrate and an array of electronic pixels;
a frontplane comprising a substrate and an array of electro-optic elements;
the frontplane being superposed on the backplane, an area of the frontplane substantially matching an area of the backplane;
a bonding area arranged for enabling connectivity to the array of electronic pixels and/or to the array of electro-optic elements.

The invention further relates to a method of manufacturing a flexible display comprising:
providing backplane arranged with an array of electronic pixels;
providing a frontplane comprising an array of electro-optic elements, an area of the frontplane substantially matching an area of the backplane;
providing a bonding area for enabling connectivity to the array of electronic pixels and/or to the array of electro-optic elements.

BACKGROUND

An embodiment of a flexible display as is set forth in the foregoing is known from WO 2006/061786A1. The known flexible display comprises an assembly of a backplane with an array of pixel electrodes and conductors to drive electronics and a frontplane on which electro-optic cells of the display are located. Electrophoretic active-matrix displays, for example, may have an active-matrix backplane and an electrophoretic frontplane. The known flexible display further comprises a bonding area arranged for enabling connectivity to the array of electronic pixels and/or to the array of electro-optic elements.

The remaining area outside the display area i.e. the area outside the outside the active matrix area is very sensitive to mechanically induced damage. This damage can range from scratches to buckling due to deformations of the very thin foil used. The remaining area can be protected using a stiffener. However, in this area to be protected drivers and a flex foil will have to be bonded. So, alignment of the stiffener is needed, as well with respect to the bonding area as well as with respect to the frontplane. It is noted that the stiffener can be also arranged at a backside.

SUMMARY OF THE INVENTION

It is an object of the invention to provide a flexible display with increased durability due to improved resistance against mechanical stress or damage.

To this end in the flexible display according to the invention the frontplane expands in a region of the backplane area outside the display area.

Preferably, the frontplane expands in a region or regions where the electrically conducting lines are present. The technical measure of the invention is based on the insight that the need for a separate aligned lamination step can be prevented by extending the frontplane substrate in the region of the backplane area outside the display area. Preferably, the frontplane expands at least in the region of the bonding area.

The flexible display according to the invention has the following advantages:
the backplane area outside the display area becomes stiffer, giving protection against strong local deformations without making the display itself thicker thus preventing the formation of buckles;
(almost) all the conducting leads are covered with a protecting foil (prevents scratching of the layers);
the layers applied on the substrate are more closely to the neutral line, which mitigates stress induced failures in these layers;
no extra lamination step is required;
no extra alignment step is required.

In an embodiment of the flexible display according to the invention, spacings are provided the area of the frontplane expanded in the region of the bonding in area for arrangement of electrical contacts and bonding driver IC's or enabling the said connectivity. Preferably, the backplane comprises organic electronics thin-film transistors and the frontplane comprises an electrophoretic display. The electrophoretic displays, are known per se, for example from US2007/0018944 A1, which is incorporated hereby by reference. More preferably, the frontplane is laminated on the backplane. More preferably, each pixel is arranged with a dedicated thin-film transistor. More preferably the array of electronic pixels and/or the array of electro-optic elements comprise layers located close to the neutral line of the respective array. This location reduces stress induced failures in these layers.

The active-matrix circuit is processed on plastic foils resulting in an active matrix backplane that can be integrated into a flexible display. This embodiment is discussed in further detail with reference to FIG. 1. The current stack may be advantageously arranged with a highly conductive gate layer (e.g. metal or indium-tin oxide), followed by organic insulator layer, a second conductive layer and an organic semiconducting layer. The organic layers may advantageously be deposited by means of a per se known method of spin-coating. The layers may be patterned using suitable photolithography, for example, employing the intrinsic photosensitivity of the layers (e.g. the insulator layers) or using a photoresist (e.g. for most of the semiconductors and conductors).

The invention further relates to a method as is set forth in claim 6. Further advantageous embodiment of the method according to the invention are set forth in claims 7, 8 and 9.

BRIEF DESCRIPTION OF THE DRAWINGS

These and other aspects of the invention will be further discussed with reference to drawings.

DETAILED DESCRIPTION OF THE DRAWINGS

Figure 1:
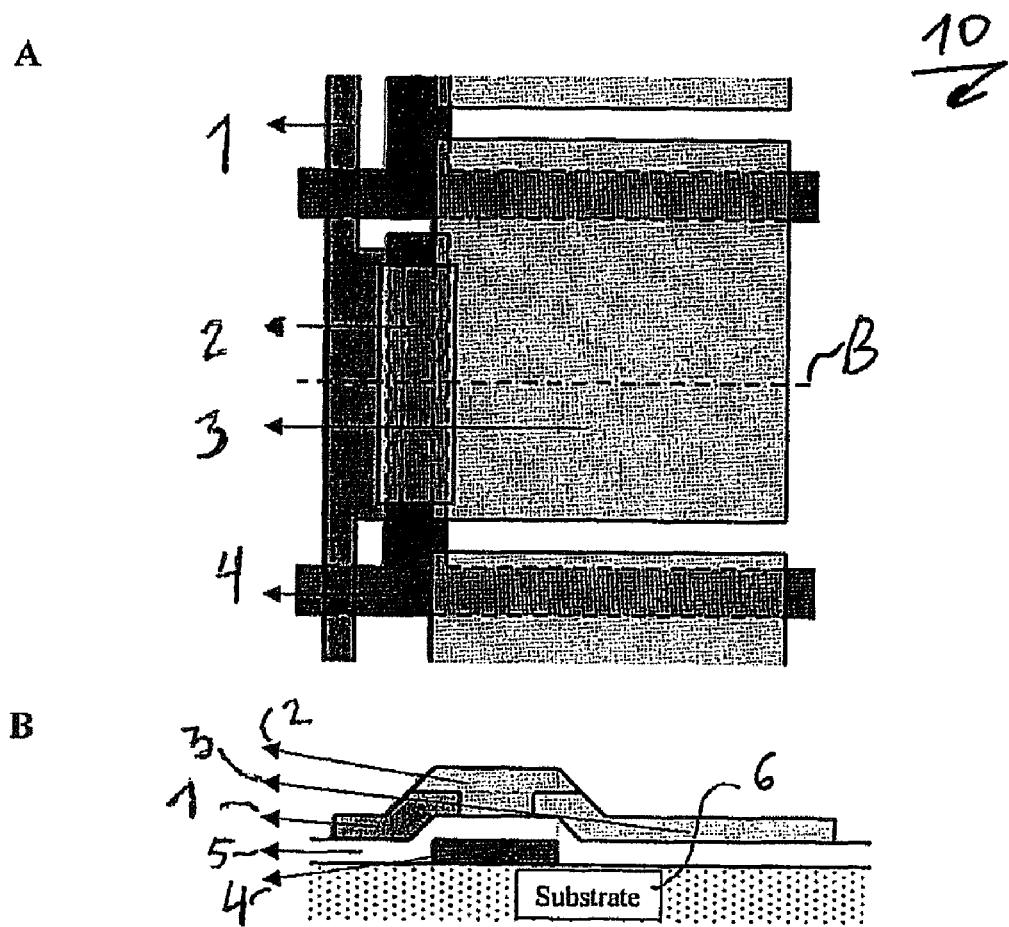
FIG. 1 presents a schematic view of an embodiment of an active-matrix circuit of the flexible display according to the invention.

FIG. 1 presents a schematic view of an embodiment of an active-matrix circuit 10 of the flexible display according to the invention. The overlay A schematically depicts a pixel pad 3, a data line 1, a date line 4 and a semiconductor 2. The section B, taken across the line B indicated in the overlay A schematically depicts a substrate 6 on top of which a gate line 4 is arranged. The gate line 4 is electrically separated from the data line 1 and the pixel pad 3 by means of a suitable insulator layer 5. The semiconductor 2 is positioned on top of the thus formed structure.

The active-matrix circuit is processed on plastic foils resulting in an AM backplane that can be integrated into a flexible display. The possible materials that can be used for the various layers are shown in Table 1. The current stack starts with a highly conductive gate layer (e.g. metal or indium-tin oxide), followed by organic insulator layer, a second conductive layer and an organic semiconducting layer. The organic layers are deposited by spin-coating. The layers are patterned by photolithography, either by use of the intrinsic photosensitivity of the layers (e.g. the insulator layers) or by use of a photoresist (e.g. for most of the semiconductors and conductors).

TABLE 1 materials used for an active-matrix circuit with polymer electronics

| Layer | Material |
| --- | --- |
| Substrate* | Polycarbonate, Polyethylene naphtalene, . . . |
| Gate line | Au, Al, Cu, Indium-tin oxide . . . |
| Insulator layer | Photoresist: HPR504, SC100, BCB |
| Data line/Pixel pad | Metal: Au, Pd, Pt, ZnSnO3, SnO2:F, Ag |
| Semiconductor | Poly-(thienylene vinylene), pentacene, . . . |

*Base material that can be coated with a number of barrier layers

Figure 2:
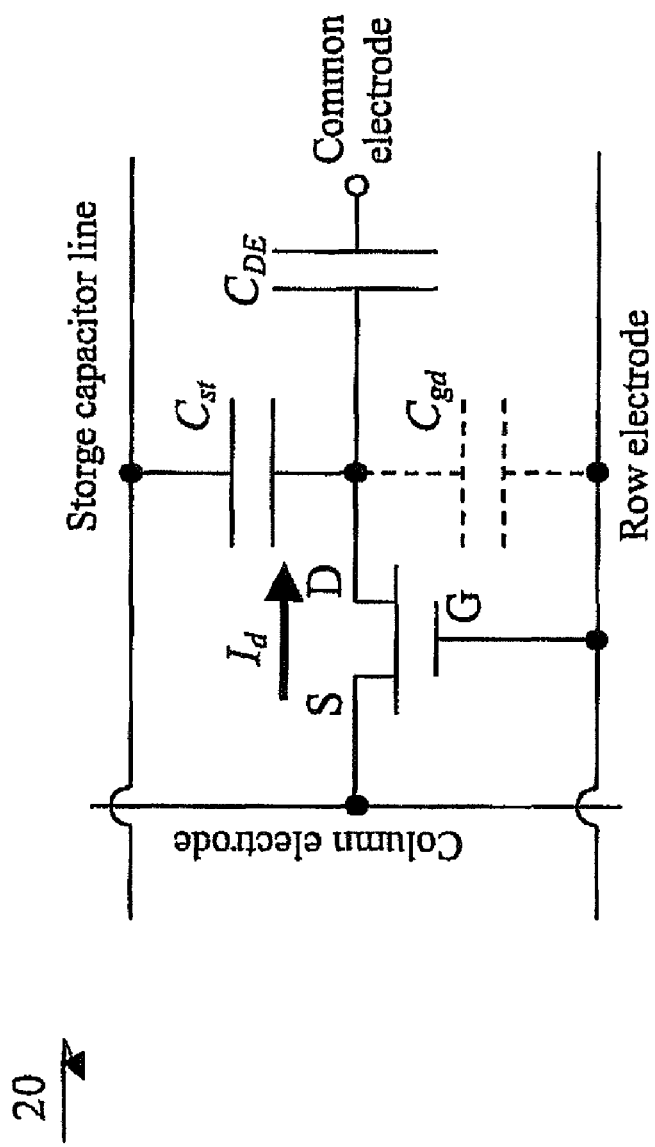
FIG. 2 presents a schematic view of an embodiment of an equivalent circuit of an active-matrix pixel of FIG. 1.

FIG. 2 presents a schematic view of an embodiment of an equivalent circuit 20 of an active-matrix pixel of FIG. 1. Active-matrix displays are driven row-at-a-time. During one frame time all the rows are sequentially selected by applying a voltage that change the TFTs from the non-conducting to the conducting state. In operation, during one frame time all the rows are sequentially selected by applying a voltage that change the TFTs from the non-conducting to the conducting state. In this line selection time the pixel capacitors (i.e. the total capacitance at the drain side of the TFT) of the selected row are charged to the voltage supplied on the column electrodes. During the remaining frame time (i.e. the hold time) the other rows are addressed. The TFTs are then in their non-conducting state and the charge on the pixel capacitors must be retained. This puts severe requirements on TFT's on- and off-current. For polymer electronics active-matrix back planes with electrophoretic capsules the typical voltages are a row select voltage of −25 V, a row non-select voltage of +25 V, a column voltage between −15 V and +15 V and a common electrode voltage of 2.5 V. These are relatively high voltages, due to the high voltage electrophoretic display effect and the fact that polymer electronics devices have to be driven at somewhat higher voltages compared to amorphous silicon devices. The advantage of using an electrophoretic display as the display effect instead of LC material is that the electrophoretic display is bi-stable. Addressing is therefore only necessary during an image update (~1 sec), while the active-matrix is at rest between image updates. As shown in FIG. 2 a storage capacitor may be used. It is used so that the requirements on TFT off-current are not too low.

Figure 3:
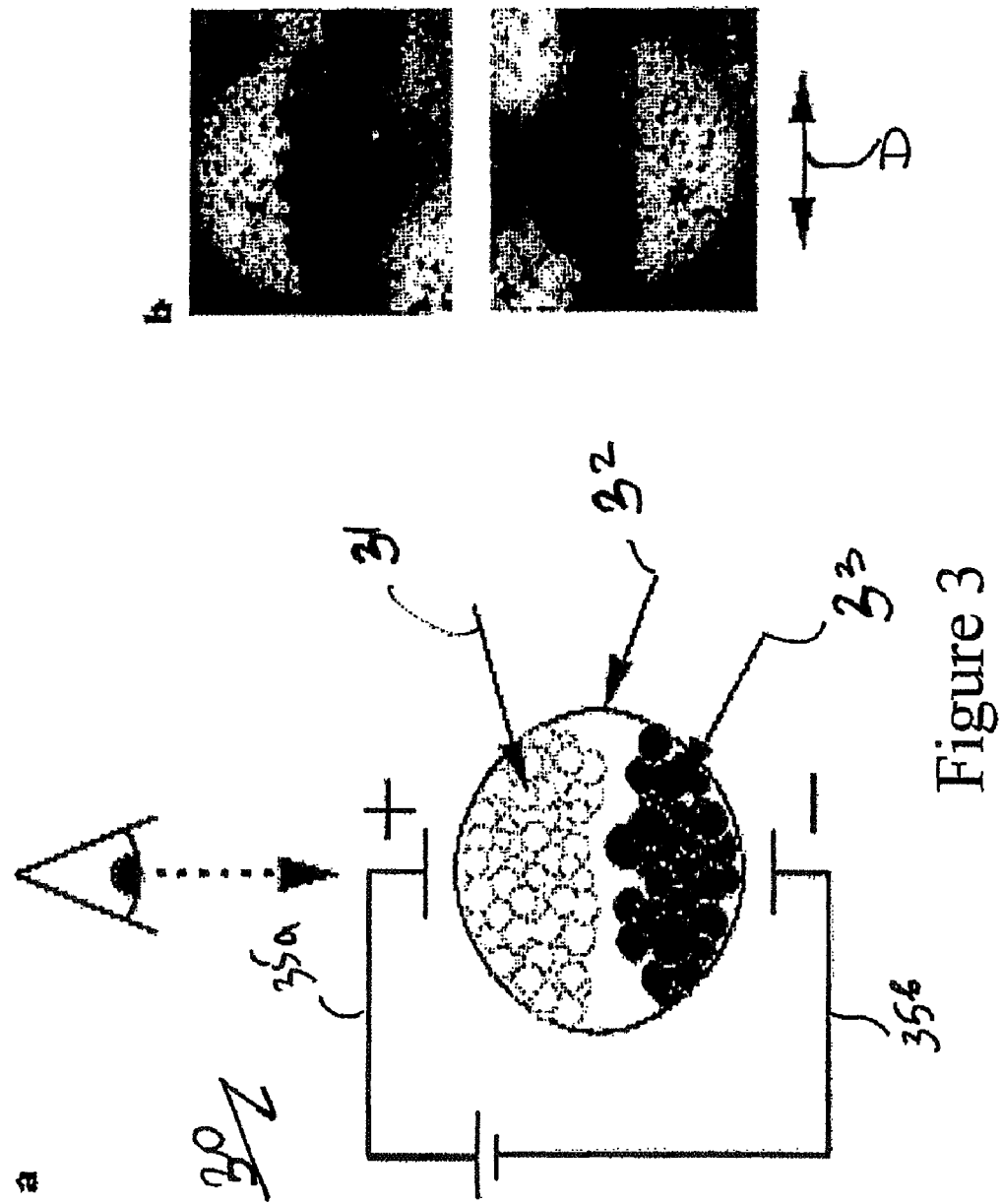
FIG. 3 presents a schematic view of an embodiment of an electrophoretic capsule.

FIG. 3 presents a schematic view of an embodiment 30 of an E Ink capsule 33 comprising black microparticles 33 and white microparticles 31. The capsule 33 is subjected to a specific external voltage by means of supplies 35a, 35b for displacing the black microparticles 33 and the white microparticles 31 in the capsule 33. In order to change image content on an electrophoretic E Ink display, the new image information is written for a certain amount of time (500 ms-1000 ms). As the refresh rate of the active-matrix is usually higher this results in addressing the same image content during a number of frames (at a frame rate of 50 Hz, 25 to 50 frames). A schematic drawing of the E Ink principle with photographs of E Ink in the white and the black state are shown in FIG. 3. A dimension of an capsule D is about 20-40 micrometer. Addressing of E Ink from black to white, for example, requires the pixel capacitors to be charged to −15 V during 500 ms to 1000 ms. During this time the white particles drift towards the top (common) electrode, while the black particles drift towards the bottom (active-matrix back plane) electrode. Switching to black requires a positive pixel voltage and at 0 V on the pixels E Ink does not switch.

As the electrophoretic display effects are bi-stable, the back plane only needs to be driven during an image update. Between image updates the pixel switches on the back plane are not driven. The drive voltages for E Ink are relatively high compared to standard LC effects. The polymer electronics devices on the active-matrix back plane must therefore be driven at relatively high voltages. For the electrophoretic material to function optimal, there is a specific humidity window in which the display can be used. Outside of this humidity window electro optical properties may deteriorate.

Figure 4:
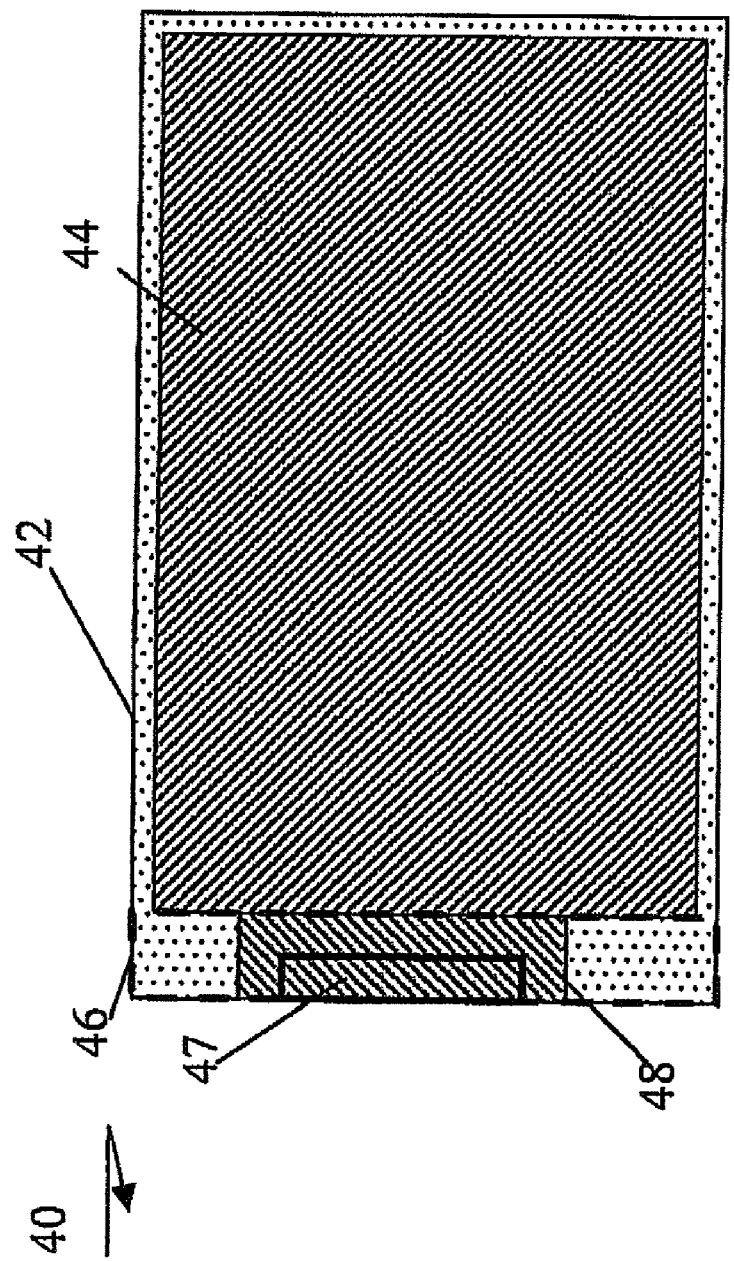
FIG. 4 presents a schematic view of an embodiment of the flexible display according to the invention.

FIG. 4 presents a schematic view of an embodiment of the flexible display according to the invention. The flexible display 40 comprises a backplane 42 as is described with reference to FIG. 1. The backplane may comprise organic or inorganic thin-film transistors. The flexible display 40 further comprises a frontplane 44, positioned on top of the backplane 42. The frontplane may comprise an electrophoretic display. Preferably, the frontplane 44 is laminated on top of the backplane 42. The flexible display 40 further comprises a bonding area 48. When a portion of the front plane is arranged, preferably is laminated, in a region of the bonding area 48, the local thickness of the overall layered structure is increased. This has an advantage that layers applied on the backplane substrate become more closely to the neutral line, which mitigates stress induced failures in these layers. In particular, regions which were not covered by the frontplane, like electrically conductive lines used for enabling electrical connectivity to the display become closer to the neutral line, which reduces mechanical stress in use. In accordance to the invention the frontplane 44 extends over an area 46 outside the display area, notably substantially corresponding with the bonding area 48. Preferably, the frontplane in the region of the bonding are 48 is provided with spacings 47 for arrangement of suitable electrical contacts for enabling a connectivity to the array of electronic pixels and/or to the array of electro-optic elements. The spacings 47 may be of any suitable shape being arranged individually or being interconnected with each-other to form a sole spacing on top of the bonding area 48. It is further noted that the frontplane does not have to be completely covered with the electrophoretic material. It is sufficient to use a suitable per se known edge seal to cover area outside the display area for improving resistance to mechanical stress.

While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. A flexible display comprising:
   a backplane comprising a substrate and an array of electronic pixels;
   a frontplane comprising a substrate and an array of electro-optic elements;
   the frontplane being superposed on the backplane, an area of the frontplane substantially matching an area of the backplane;
   a bonding area arranged for enabling connectivity to the array of electronic pixels and/or to the array of electro-optic elements; and
   wherein the frontplane expands in a region of the backplane area outside a display area, and
   wherein spacings are provided in the area of the frontplane expanded in the region of the backplane area outside the display area for arrangement of electrical contacts for enabling the said connectivity.

2. A flexible display according to claim 1, wherein the frontplane expands at least in the region of the bonding area.

3. A flexible display according to claim 1, wherein the backplane comprises thin-film transistors and the frontplane comprises an electrophoretic display.

4. A flexible display according to claim 3, wherein the frontplane is laminated on the backplane.

5. A flexible display according to claim 1, wherein the array of electronic pixels and/or the array of electro-optic elements comprise layers located close to a neutral line of the respective array.

6. A method of manufacturing a flexible display comprising:
   providing backplane arranged with an array of electronic pixels;
   providing a frontplane comprising an array of electro-optic elements, an area of the frontplane substantially matching an area of the backplane, the frontplane being expanded in a region of the backplane area outside a display area;
   providing a bonding area for enabling connectivity to the array of electronic pixels and/or to the array of electro-optic elements; and
   forming a spacing in the area the frontplane expanded in the region of the backplane area outside the display area for arrangement of electrical contacts for enabling the said connectivity.

7. A method according to claim 6, wherein respective layers of the backplane and/or the frontplane are deposited on a substrate by spin-coating.

8. A method according to claim 6, wherein the respective layers of the backplane and/or the frontplane are patterned using photolithography.

9. A flexible display according to claim 2, wherein the backplane comprises thin-film transistors and the frontplane comprises an electrophoretic display.

10. A flexible display according to claim 1, wherein the backplane comprises thin-film transistors and the frontplane comprises an electrophoretic display.

11. A flexible display according to claim 2, wherein the array of electronic pixels and/or the array of electro-optic elements comprise layers located close to a neutral line of the respective array.

12. A flexible display according to claim 1, wherein the array of electronic pixels and/or the array of electro-optic elements comprise layers located close to a neutral line of the respective array.

13. A flexible display according to claim 3, wherein the array of electronic pixels and/or the array of electro-optic elements comprise layers located close to a neutral line of the respective array.

14. A flexible display according to claim 4, wherein the array of electronic pixels and/or the array of electro-optic elements comprise layers located close to a neutral line of the respective array.

* * * * *